US008407337B2

(12) United States Patent
DeBettencourt et al.

(10) Patent No.: US 8,407,337 B2
(45) Date of Patent: Mar. 26, 2013

(54) MULTIPLE INSTANCE COMMERCIAL BROWSER WEBSITE TEST AGENT

(75) Inventors: Jason DeBettencourt, Medfield, MA (US); Matthew Cross, Stoughton, MA (US); William Ryan Breen, Melrose, MA (US)

(73) Assignee: Compuware Corporation, Detroit, MI (US)

( * ) Notice: Subject to any disclaimer, the term of this patent is extended or adjusted under 35 U.S.C. 154(b) by 901 days.

(21) Appl. No.: 12/502,502

(22) Filed: Jul. 14, 2009

(65) Prior Publication Data

US 2011/0016205 A1 Jan. 20, 2011

(51) Int. Cl.
*G06F 15/173* (2006.01)
(52) U.S. Cl. ........................................ 709/224; 709/223
(58) Field of Classification Search .................. 709/224, 709/223
See application file for complete search history.

(56) References Cited

U.S. PATENT DOCUMENTS

| 7,010,598 | B2 | 3/2006 | Sitaraman et al. | |
|---|---|---|---|---|
| 7,353,272 | B2* | 4/2008 | Robertson et al. | ............ 709/224 |
| 7,757,175 | B2 | 7/2010 | Miller | |
| 7,765,295 | B2* | 7/2010 | Anastas et al. | ................ 709/224 |
| 2003/0093400 | A1 | 5/2003 | Santosuosso | |
| 2005/0262240 | A1* | 11/2005 | Drees et al. | ................... 709/224 |
| 2007/0055766 | A1* | 3/2007 | Petropoulakis et al. | ....... 709/224 |
| 2008/0114875 | A1* | 5/2008 | Anastas et al. | ................ 709/224 |

OTHER PUBLICATIONS

PCT International Search Report and Written Opinion, PCT Application No. PCT/US2010/041365, Sep. 1, 2010, eleven pages.

* cited by examiner

*Primary Examiner* — Kristie Shingles
(74) *Attorney, Agent, or Firm* — Fenwick & West LLP (57) ABSTRACT

A website test environment invokes multiple instances of a commercial browser, and captures invocations of browser operations for gathering performance data without interference from other instances or multiple occurrences of the operating system (OS). Commercial browsers often employ constraints that assume only a single instantiation is executing on a particular machine. Configurations allow each instance to present as a separate user, thus avoiding conflicts that may arise from temporary files and network connections, for example. Each browser instance operates as a performance agent and dynamically links with a set of entry points for accessing performance related browser operations. As each agent invokes native (OS specific) machine functions for network access via particular entry points, configurations disclosed herein redirect the entry points to a collection layer of instructions (code) for capturing performance data in addition to invoking the native OS function called for by the browser operation.

20 Claims, 7 Drawing Sheets

MULTIPLE INSTANCE COMMERCIAL BROWSER WEBSITE TEST AGENT

BACKGROUND

Internet transactions are becoming an ever-increasing aspect of everyday life. Retail purchases, travel arrangements and banking activities are but a few of the transactions for which Internet transactions have largely replaced conventional paper and/or in-person exchanges. Similarly, service providers and vendors of Internet transactions have become increasingly aware of the Internet as a business conduit and the need for maintaining an effective and efficient web presence. Accordingly, the vast majority of modern businesses and institutions have websites, and many of these provide for interactive transactions in addition to passive information dissemination.

Business owners have also recognized that an effective web presence for interactive transactions requires providing a positive user experience, as the same ease of use that makes Internet transactions attractive also facilitates pursuing a transaction elsewhere on the website of another provider. In other words, potential customers may easily pursue a competitor's website if your own does not provide a positive user experience. However, many parameters affect the user experience of a website transaction. Network connection speed, user network proximity, concurrent user volume, and website execution complexity and speed all affect the perceived user experience, frequently based on the speed of the transaction. Accordingly, it would be beneficial to evaluate website performance and identify slowdowns and bottlenecks which may contribute to a negative user experience.

SUMMARY

Website performance tends to be scrutinously viewed because it takes little effort for a user to leave a nonperforming website in favor of a faster or more responsive site. Website providers therefore place value on performance evaluations of their websites, and in evaluating bottlenecks and performance degradation conditions, particularly under a variety of loads and from diverse remote counterparts (browsers). Conventional website testing employs a specialized browser with embedded logging functions performing website transactions. At predetermined points or thresholds of a transaction, usually marked by a performance related system service (OS) call, the specialized embedded logging functions store timing information in a log file to mark the beginning and completion of an operation on the website being tested. Such conventional approaches suffer from the shortcoming that they require a custom browser having embedded performance code, and thus may not be widely accepted by users and may present currency issues to remain comparable with regular revisions of commercial browsers. Further, applying logging features to commercial browsers presents the additional shortcoming of instantiating multiple instances for test purposes, as commercial browsers typically inherit machine specific defaults and settings which are based on a single instance on a particular machine.

Accordingly, configurations herein substantially overcome the shortcomings presented by custom embedded performance monitoring code and multiple instantiations of browsers by providing a method and apparatus for invoking multiple instances (instantiations) of a commercial browser on a particular server, and capturing invocations of browser operations for gathering timing and other performance data via each of the instances without interference from other instances and without multiple occurrences of the operating system (OS) for supporting the multiple browser instances. Common typical browsers, such as Internet Explorer®, Mozilla™ Firefox® and Safari®, to name several, often employ constraints that assume only a single instantiation is executing on a particular machine. Configurations herein allow each instance to present as a separate user, thus avoiding conflicts that may arise from temporary files and network connections, for example. Each browser instance operates as a performance agent and dynamically links with an instance (user) specific set of entry points for accessing performance related browser operations. As each commercial browser invokes native (OS specific) operations for network access via particular entry points, configurations disclosed herein redirect these entry points to a collection layer of instructions (code) for capturing performance data in addition to invoking the native OS function called for by the browser operation. In this manner, browser operations of commercial browsers are intercepted for logging performance data such as timing prior to invoking the OS function, typically a library call, and optionally for logging additional performance data at the completion of the OS function.

In an example configuration such as disclosed herein, the entry point corresponds to a dynamically linked library (DLL), as is known in the art, and entry points pertinent to performance sensitive browser operations are identified and redirected as the commercial browser is loaded. Entry points to invoke native OS library routines (i.e. call) are copied and replaced with a redirection entry point to a collection layer of instructions (code). The collection layer includes the copied entry point and appends performance logging calls before and after the copied entry point so that timing of OS library routines, such as connections and requests, is obtainable. After resolving the DLL entry points in the commercial browser with the specialized performance logging entry points in the collection layer, the loaded commercial browser becomes operable as a performance agent. Further, library calls to settings, typically specific to a user or machine, are intercepted and differentiated for each of the several browser instances which may be running on a particular machine. Multiple browser instances avoid the need for separate machines or OS instances for each browser instance operating as a performance agent, thus allowing a single server to initiate performance tests from multiple concurrent transactions, each running on a respective browser.

In further detail, the method for gathering website performance data using a browser performance agent for performing website transactions as disclosed herein includes loading a performance agent on a server, in which the performance agent is for identifying and recording occurrences of browser events pertaining to website performance, and redirecting, in the loaded performance agent, invocations of browser operations pertinent to the website performance, such that the redirected invocations are for recording the invoked browser operations. The method performs, via the performance agent, the redirected browser operations for targeting a website under test, such that the browser operations (operations) result in the browser events pertaining to the website performance. A log or repository records the browser events for the performance agents on the server, in which the operations (e.g. library invocations or calls) are provided by a single instantiation of a native operating system providing the invoked operations. The redirected library calls return execution control to the performance agent following the redirected operation invocation and recordation of the browser event, execution returning to a point at which an unredirected operation invocation would have resumed.

In the example configuration, a test environment context loads a plurality of performance agents, such that each performance agent independently invokes the operations as a separate user, therefore invoking a browser operation by one of the plurality of performance agents does not interfere with the others of the plurality of performance agents.

During loading, the loader identifies, in the performance agent, invocations to the operations, in which the operations are native services of the machine (typically called "system services" or "OS services"), in which the native services are provided by the operating system such that each of the operations is part of a native service. Loading identifies transfer points (e.g. a code invoking transfer point, or "jump code") for deferring browser control to an operation in the native services.

In the illustrative configuration, the native services are provided by a library of dynamically linked library (DLL) routines, each operation having an entry point or transfer point for transferring control to the DLL, in which the native services are network services indicative of timing of network events, the network events for deriving performance data. Redirecting the native call invocation to the performance gathering collection segment includes copying, from the identified transfer point, instructions for invoking the operation in the native service, and inserting, at the identified transfer point, instructions to invoke a monitoring function in lieu of the instructions for invoking the operation in the native services. The server and/or loader then defines a monitoring sequence (e.g. collection segment of code) that includes the copied instructions and calls (usually a timer start/stop sequence) for recording a browser event or result from the invoked browser operation, discussed further below.

Alternate configurations of the invention include a multi-programming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable storage medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM, RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

In the disclosed testing environment, commercial browsers are linked with the specialized DLLs for redirecting native service calls (system services) to the collection layer which includes a collection segment of code for each invoked service call designated as performance related. Alternate configurations may employ other dynamic or static linkages for redirecting performance related system service calls; the DLL configuration is employed as an example. In one configuration, multiple browser instances coexist on a single machine under a particular operating systems to avoid the overhead required for multiple OS instances and/or hypervisor arrangements. As conventional browser instances rely on a single browser instance, configurations herein resolve browser settings and parameters such that multiple instances do not conflict.

Figure 1:
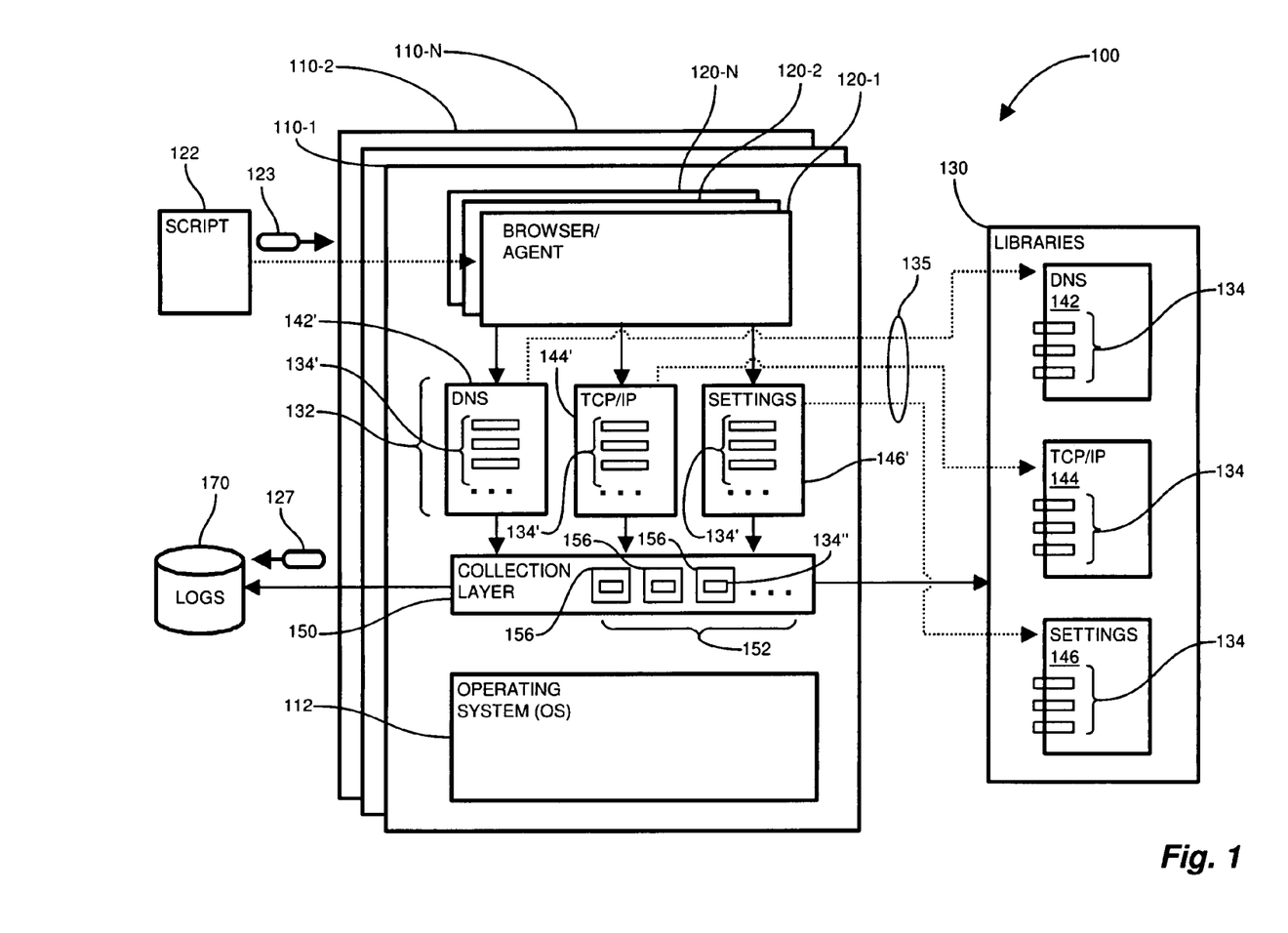
FIG. 1 is a context diagram of a browser computing environment suitable for use with the present invention.

FIG. 1 is a context diagram of a browser computing environment 100 suitable for use with the present invention. Referring to FIG. 1, a browser environment 100 typically includes processes 110-1 ... 110-N (110 generally) having a browser 120-1 ... 120-N (120 generally), for interacting with a website under test, running on an operating system 112, such as a Windows®, Mac® or Linux based systems. A set of libraries 130 is accessible via a system services layer 132, which establishes entry points 134' for accessing the corresponding operations 134 in the libraries 130 at runtime, shown as dotted lines 135. The libraries 130, in the example arrangement, take the form of DLLs to allow for runtime binding and redirection, discussed further below. The browser 120, upon loading, links with one or more libraries 130, such as TCP (Transmission Control Protocol) 142, DNS (Domain Naming Services) 144, and settings 146. The disclosed libraries 130 are an example; other configurations may employ other and additional libraries that are redirectable and invokable in a similar manner. A collection layer 150 includes collection segments 152 for gathering performance data for each invocation of the DLL entry points (DLLs) 134', discussed further below. Conventional DLLs provide services in the form of calls 135 directly to the native OS for performing various functions such as browser operations. The collection layer 150 therefore effectively redirects the DLL entry points 134' to the native OS libraries 130 by including instructions and calls in the collection segment 152 for logging performance data in conjunction with the native OS call requested as a browser operation. The DLLs typically track a library 130 of available functions for invocation by various processes 110 running under the particular OS 112 being employed. In the example arrangement shown, the browser 120 operates as a performance agent for invoking the system services layer 132 as OS libraries for performing browser operations.

Configurations herein inject monitoring functions into the DLL call sequence by generating the collection layer 150 and loading the browser 120 with references to the collection segments 152 in the collection layer 150. As the nature of DLLs is deferral of address binding until runtime, each entry point 134' to a browser operation (i.e. a system service invocation pertinent to browser performance) is redirected to a collection segment 152. Each collection segment 152 includes a copied entry point 134' corresponding to the intended browser operation 134 invoked, along with performance monitoring calls to collect performance data. The original entry point 134' in the system service layer 132 is replaced with the entry point 156 to the corresponding collection segment, which will in turn invoke the corresponding library function 134 sought by the browser operation, in addition to logging the collected performance data.

Referring specifically to the disclosed library modules 142', 144' and 146', each has entry points 134' for transferring conventional control to the corresponding library 142, 144 and 146, respectively, in the libraries 130, for invoking the corresponding library operation 134. Redirection moves the entry point 134' jump code to the collection segment 152, places a reference to the collection segment 156 where the entry point 134' had been, and points the collection segment 152 to the intended library operation 134 by inserting the copied jump code 134" adjacent to performance gathering calls, discussed in FIG. 3 below.

Figure 2:
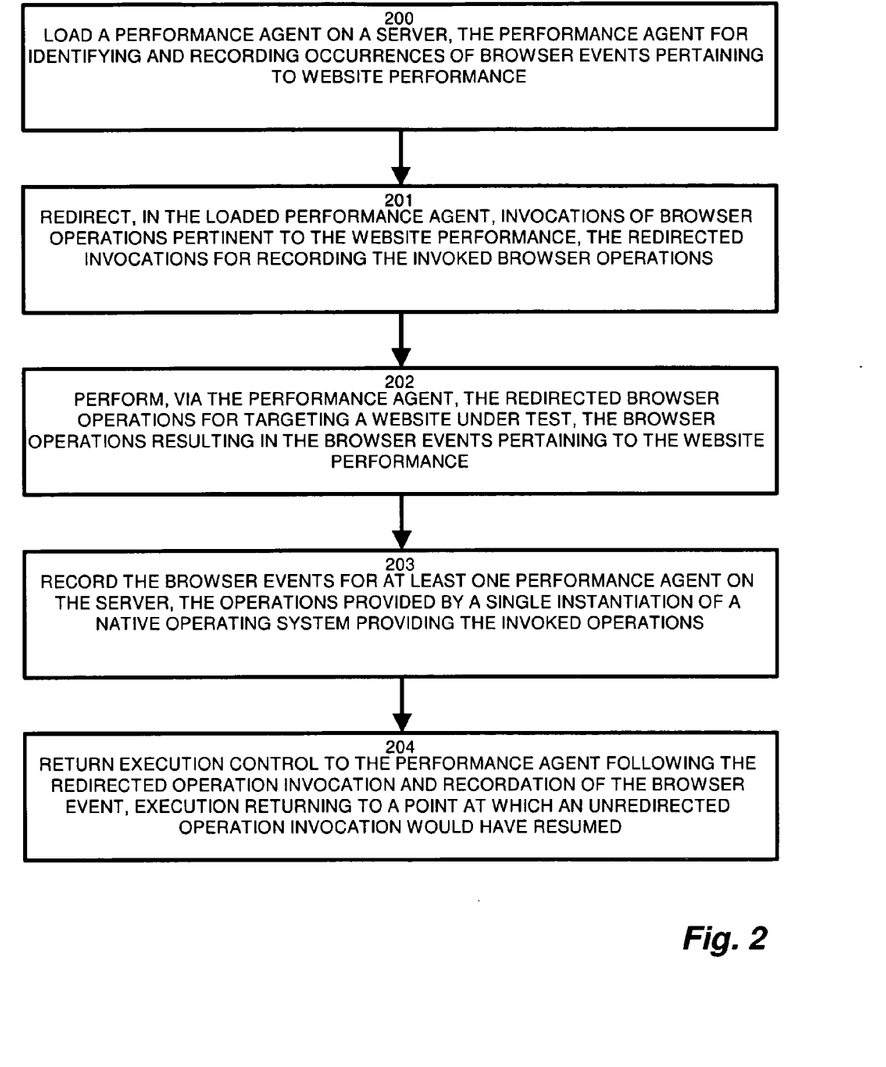
FIG. 2 is a flowchart of performance agent operation in the browse computing environment of FIG. 1.

FIG. 2 is a flowchart of performance agent 120 operation in the browser computing environment 100 of FIG. 1. Referring to FIGS. 1 and 2, at step 200, the method for gathering website performance data using a browser performance agent 120 for performing website transactions as defined herein includes loading the performance agent 120 on a server (102, FIG. 4), in which the performance agent 120 is for identifying and recording occurrences of browser events pertaining to website performance. The performance agent 120 is a commercial browser commonly available via a public access network such as the Internet, as described above, thus readily available for performing conventional browser based (web) transactions. Upon execution, or at some other time as expected by the library 130 references (calls) 135, the method redirects, in the loaded performance agent 120, invocations of browser operations pertinent to the website performance, such that the redirected invocations are for recording the invoked browser operations, as depicted at step 201. The set of library calls designated as performance related is predetermined according to desired test results, such as fetching web pages and objects, setting up and tearing down connections, and executing Java scripts and other code typically found within HTML based pages. The redirected calls 135 allow the commercial browser to operate as a performance agent 120 for gathering the performance data of transactions.

Testing, in the example configuration, involves script 122 driven Internet usage for performing, via the performance agent, the redirected browser operations for targeting a website under test, such that the browser operations result in the browser events pertaining to the website performance, as disclosed at step 202. Conventional approaches for website testing employed a custom browser responsive to the script 122, however modern commercial browsers employ an API sufficient to drive tested browser functions as described herein. A testing environment therefore may include multiple performance agents 120 (browser instantiations with the embedded DLL intercepts) invoking a set of scripts 123 for directing the transactions focused on websites under test. Alternate configurations may include user based browser instances, possibly with remote linking via cookies or other downloaded references to the DLL intercepts 132 for performance logging. From the performance agents 120, the invoking server 102 records the browser events for at least one performance agent 120 on the server, in which the operations are provided by a single instantiation of a native operating system 112 providing the invoked operations, as shown at step 203. Once control is deferred to a monitored browser operation, performance information such as time intervals, IP addresses, and other performance information is recorded in addition to invoking the requested browser operation 134. The invoked collection segment 152 returns execution control to the performance agent 120 following the redirected operation invocation and recordation of the browser event, such that execution returns to a point at which an unredirected operation invocation would have resumed. In other words, the redirected browser operation, once logging performance data and performing the desired browser operation 134, returns to the same instruction to which a non-logged call of the browser operation would have returned.

Figure 3:
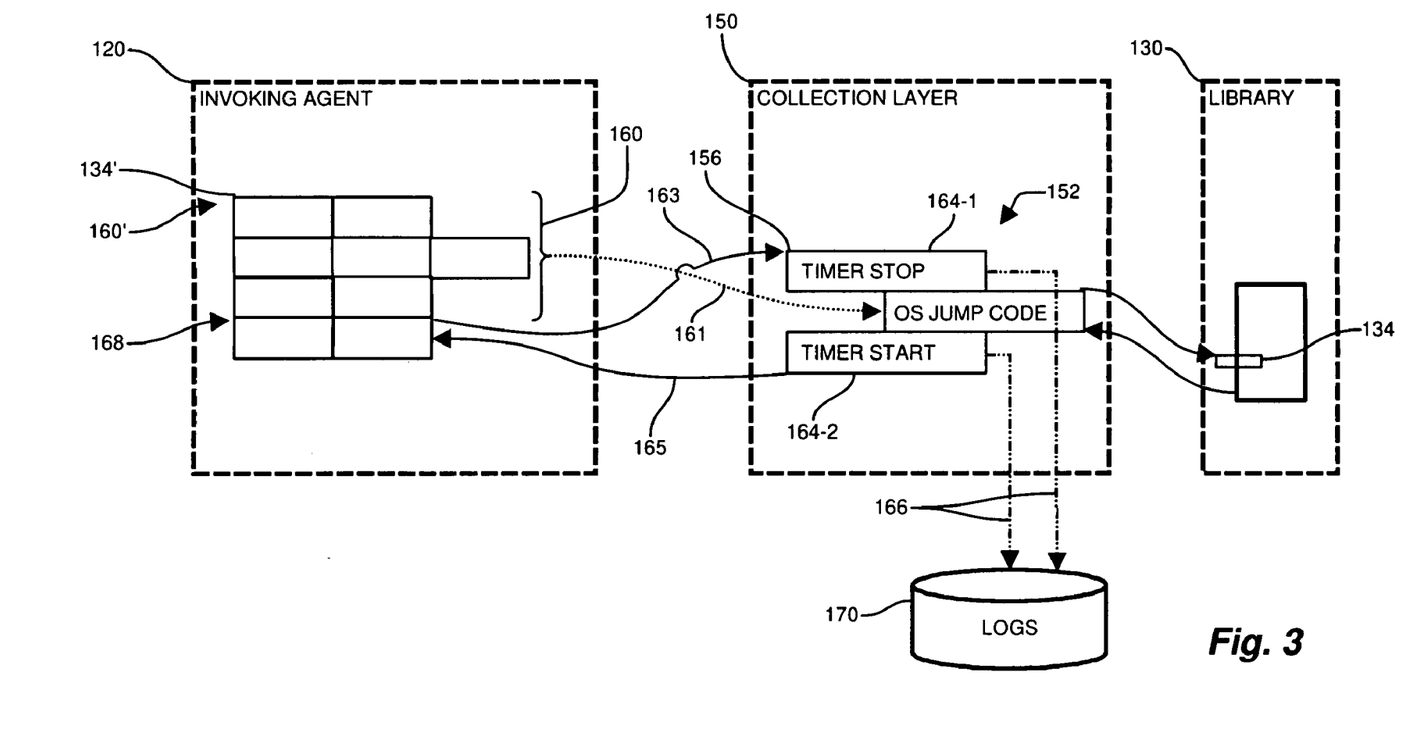
FIG. 3 is a control flow diagram of performance data capture in a performance agent of FIG. 2.

FIG. 3 is a control flow diagram of performance data capture in the performance agent 120 of FIG. 1. Referring to FIGS. 2 and 3, an entry point 134' is invokable by the browser 120 for accessing a system service library 130 via the system service layer 132 for a browser operation 134. The example configuration employs a DLL as is known in the Windows OS; other implementations may be apparent. The entry point 134' includes a 7 byte reference of jump code 160 for transferring control to the library 130 and to the operation 134 intended by the invocation. The jump code 160 is copied to a corresponding collection segment 152 in the collection layer 150, shown by arrow 161, and replaced with a collection entry point 160' for transferring control to the start 156 of the collection segment 152 in the collection layer 150, shown by arrow 163. Performance gathering code 164, such as timer start 164-1 and timer stop 164-2, encapsulate the jump code 160 so that the performance data including completion time of the browser operation may be captured. The jump code 160 is operable to invoke the intended operation 134 while the timer start 164-1 and timer stop 164-2 log the performance data 166 and return control to the system service layer 132 at the location 168 following the copied entry point 134', shown by arrow 165.

Figure 4:
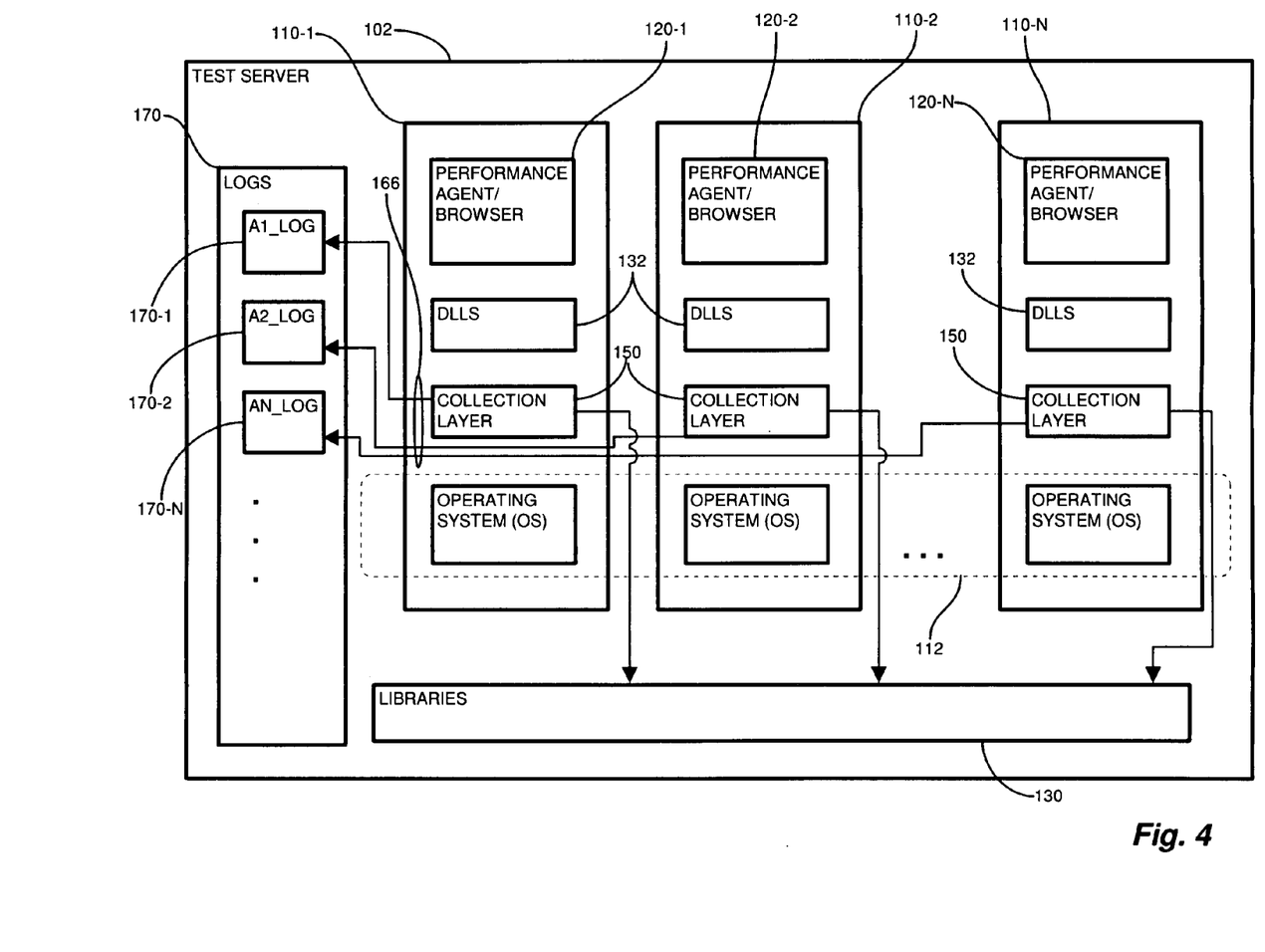
FIG. 4 is a block diagram of performance agents in the environment of FIG. 1.

FIG. 4 is a block diagram of performance agents in the environment 100 of FIG. 1. Referring to FIGS. 1, 3 and 4, in the example configuration shown, a website test server 102 supports multiple processes 110-2 . . . 110-N (110 generally) each employing a browser 120-N (120 generally) as a performance agent. Configurations herein employ any suitable browser and encapsulate performance relevant browser operations with calls to log performance data via DLLs as described above. Each process 110 has a DLL layer 132 and a collection layer 150 on top of a common OS 112, which is common to all processes on the server 102. The invocation of a process specific collection layer 150 for each process avoids conflicting system service calls (invocations) which may occur when multiple browser instantiations 120-N occur under the same OS 112. Conventional approaches may employ multiple OS instantiations for each browser instance, possible via a hypervisor, however operational overhead rapidly becomes a limiting factor as each OS instance tends to be resource intensive. The collection segments 152 generated for each invocation of a performance relevant system service each send performance data 166 to log files 170. Each process 110, and hence each agent 120 has process specific log file 172-1 . . . 172-N (172 generally) for logging performance data, such as timing information for system service invocation, as well as other performance indicators such as browser parameter modification. The collection segments 152 therefore log agent 120 specific performance data in addition to invoking the expected library 130 based system service via the copied entry point 134' such that normal, expected browser operation occurs in addition to performance data gathering.

Figure 5:
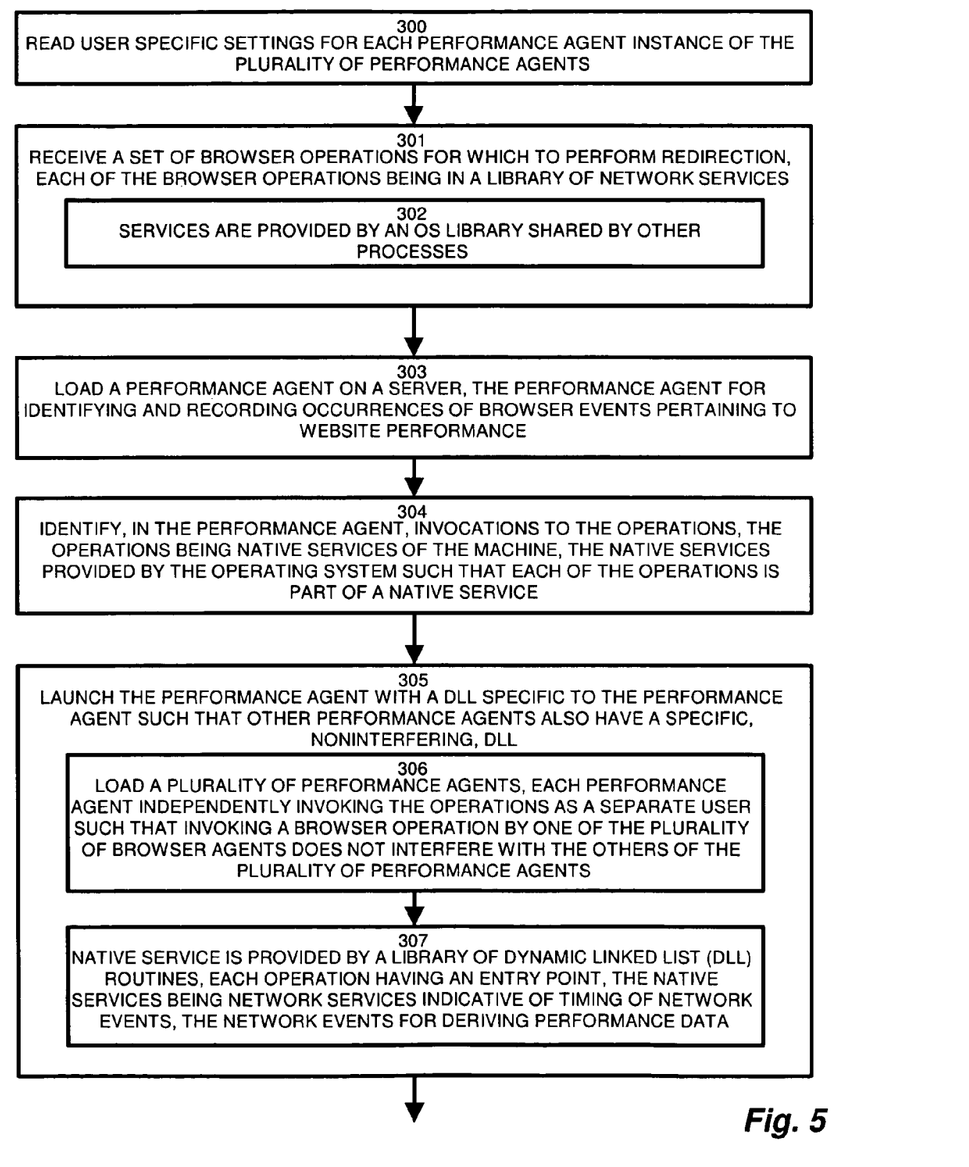
FIGS. 5-7 are a flowchart of performance agent configuration and operation for the performance agents of FIG. 4.
Figure 6:
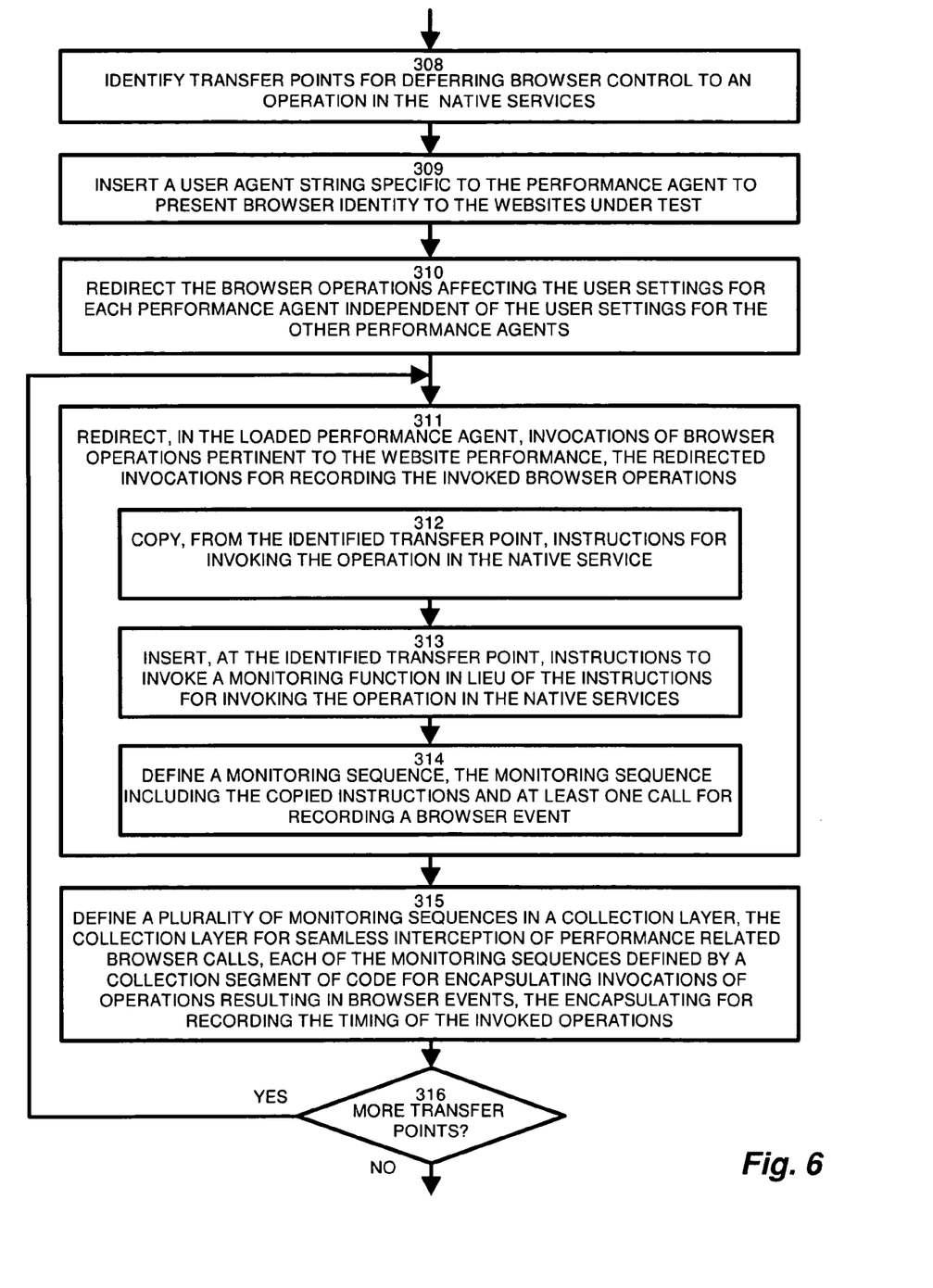
Figure 7:
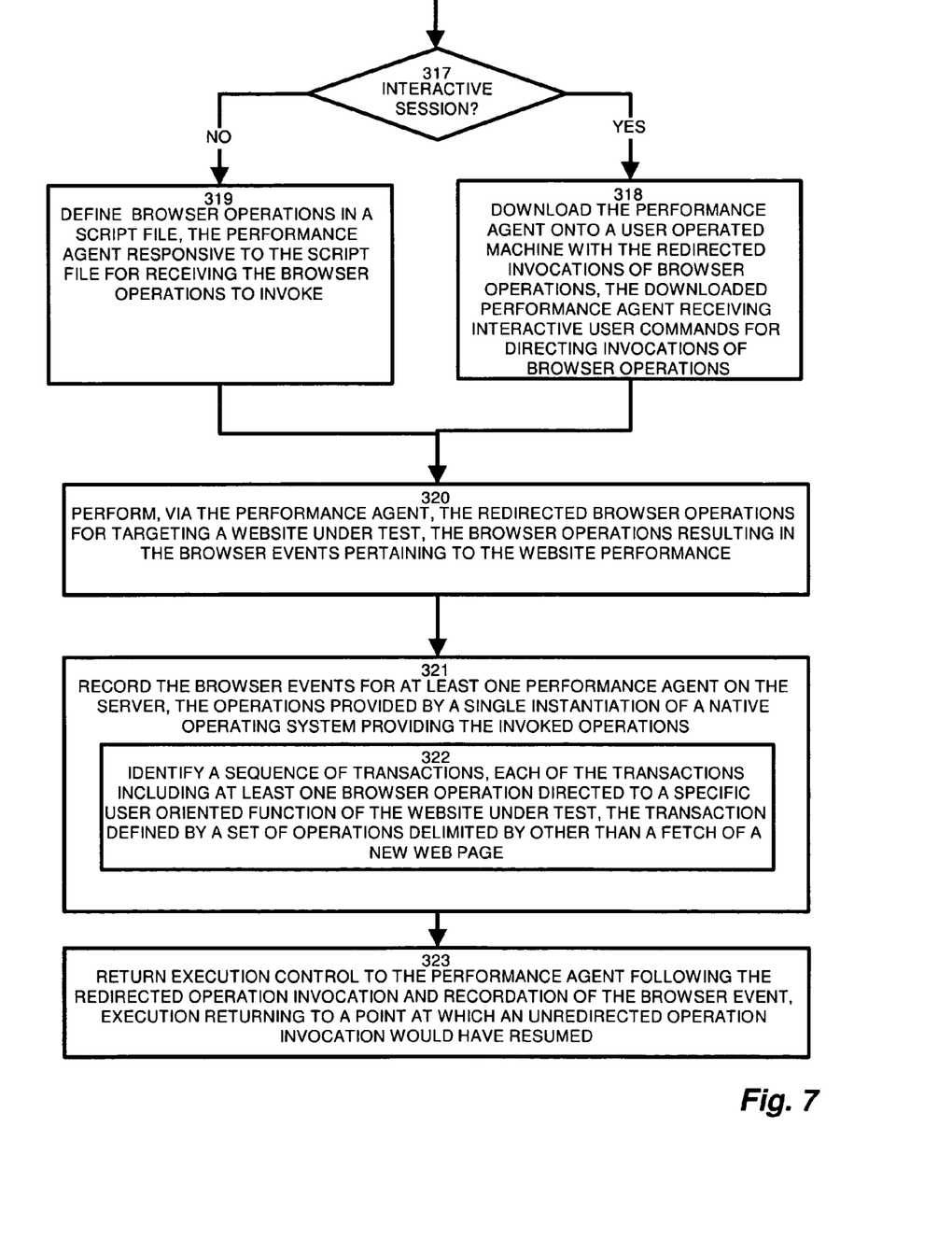

FIGS. 5-7 are a flowchart of performance agent configuration and operation for the performance agents of FIG. 4. Referring to FIGS. 3-7, at step 300, loading the performance agent further includes reading user specific settings 146 for each performance agent instance 120 of the plurality of performance agents 120-N. The library 130 module including the instance specific settings 146 includes browser specific parameters such as temporary file locations and defaults which may tend to conflict if specified by multiple agents 120 on the same machine. Since conventional browsers employ a single instantiation even to support multiple windows (i.e. Internet URL sessions), no other instantiations of the browser are expected. Multiple agent instantiations 120-N as disclosed herein each employ noninterfering settings so that multiple agents 120 avoid conflicts while creating temporary files or establishing TCP/IP connections, for example.

The agents 120-N each receive a set of browser operations for which to perform redirection, in which each of the browser operations is included in a respective library of network services 142, 144, 146, as depicted at step 301. Each of the library entry points 134' for which performance related data is to be gathered is identified. In the illustrative configuration, the library 130 entry points are included in modules 142, 144, 146 for grouping types of network operations, and are referenced (invoked) from corresponding DLLs 142' 144', 146' in the invoking agent 120, thus the services are provided by an OS library 130 shared by other processes, as shown at step 302, however other invocations of performance operations may be performed by identifying the respective entry points 134'.

Having identified each of the library calls 135 for which performance data will be collected, the method for gathering website performance data using a browser performance agent 120 for performing website transactions further includes loading the performance agent 120, such that the performance agent 120 is for identifying and recording occurrences of browser events pertaining to website performance, as depicted at step 303. In the illustrated arrangement, the performance agents 120 are commercial browsers dynamically linked with library calls (invocations) 135 to performance related operations (browser operations). Thus, the process 110 identifies, in the performance agent 120, invocations to the operations 134, in which the operations are native services of the machine provided by the operating system such that each of the operations is part of a native service inherent in the operating system, as disclosed at step 304.

As is known in the art, typical operating systems include such libraries 130 of common functions and operations adapted for use on the particular machine (server) 102 and under the executing operating system 112. The server 102 launches the performance agent 120 with a DLL 132 specific to the performance agent 120 such that other performance agents 120-N also have a specific, noninterfering, DLL so that library invocations do not interfere with invocations of other performance agent 120 invocations, as depicted at step 305. This provides a suitable environment 100 for loading a plurality of performance agents 120, such that each performance agent independently invokes the operations as a separate user such that invoking a browser operation 134 by one of the plurality of performance agents 120 does not interfere with the others of the plurality of performance agents 120, as disclosed at step 306. In the example configuration, the native services are provided by a library 130 of dynamically linked library (DLL) routines, in which each operation 134 has an entry point 134', and in which the native services are network services indicative of timing of network events for deriving performance data, as depicted at step 307. Thus, the illustrative performance agent 120 represents a commercial off-the-shelf (OTS) browser with a specialized DLL layer 132 for executing multiple agent 120-N instances with performance data logging capability integrated with the particular set of library calls 135 deemed to be performance related.

To launch the performance gathering agent 120, the server 102 identifies transfer points for deferring browser control to an operation in the native services 130. In the DLL based example, the transfer point is an entry point 134' to the performance related DLL library 142, 144, 146, as shown at step 308. To maintain performance agent 120 independence with other agents 120-N, the process 110 inserts a user agent string specific to the performance agent 120 to present browser identity to the websites under test, as depicted at step 309. The user agent string identifies the invoking machine 102 to the remote website to identify display capabilities, data format preferences, and other browser specific settings, and is employed to maintain agent 120 instance differentiation since each performance agent 120 presents as a different user. While the user agent string may be merely one of multiple headers accompanying each transaction, the settings depicted by the user agent string are employed such that multiple browser instantiations present as separate entities to a remote website.

As indicated above, the browser operations include defining user settings to differentiate each agent instance. The process 110 thus redirects the browser operations affecting the user settings for each performance agent 120 independent of the user settings for the other performance agents 120-N, as depicted at step 310. This type of initialization occurs during loading via the settings 146 to persist during execution, and generally need not be revisited upon successive library 130 invocations. For the remaining performance related DLL invocations 134, the process 110 redirects, in each loaded performance agent 120, invocations of browser operations 134 pertinent to the website performance, in which the redirected invocations are for recording the invoked browser operations 134, as depicted at step 311. This includes copying, from the identified transfer point 132' (entry point), instructions 134" for invoking the operation 134 in the native service (library 130), as shown at step 312, and inserting, at the identified transfer point 134', instructions 160' to invoke a monitoring function in lieu of the instructions for invoking the operation in the native services, as depicted at step 313. The process 110 then defining a collection segment 152 as a monitoring sequence, such that the monitoring sequence includes the copied instructions 134" and at least one call 164-1, 164-2 for recording a browser event, as depicted at step 314 and shown by arrows 166.

Conventional library invocations execute an entry point to transfer control to the library 130. Configuration herein generate collection segments 152 of instructions for transferring control by defining a plurality of monitoring sequences in the collection layer 150, in which the collection layer is for seamless interception of performance related browser calls, and in which each of the monitoring sequences is defined by a collection segment 152 of code for encapsulating invocations of operations (i.e. entry points 134') resulting in browser events, such that the encapsulating is for recording the timing of the invoked operations or for gathering other performance data, as disclosed at step 315. The generated collection segment 152 therefore includes both the jump code 160 for invoking the desired browser operation 134 as well as the performance gathering code 164 for storing performance data. The original jump code 160 is replaced with a segment 160' for transferring control to the start 156 of the collection segment 152. As a collection segment 152 is generated for each performance related library invocation, a check is performed to determine if there are more transfer points (library invocations), at step 316, and control reverts to step 311 until all the identified transfer points are supplemented with collection segments 152.

In particular arrangements, the collection layer 150 is received from a remote server by an interactive user session. The collection layer 150 links with the native service entry points 134', possibly transparent to the interactive user. Accordingly, a check is performed, at step 317, to determine if an interactive session exists. If the session is interactive, then loading the performance agent 120 further includes downloading the performance agent 120 and/or the corresponding collection layer 150 onto a user operated machine with the redirected invocations of browser operations, such that the downloaded performance agent 120 receives interactive user commands for directing invocations of browser operations, as disclosed at step 318. Otherwise, the performance agent 120 is operating in a parallel test arrangement such that the performed browser operations are defined in a script file 123, such that the performance agent 120 is responsive to the script file 123 for receiving the browser operations to invoke, as disclosed at step 319. The performance agents 120 then perform the redirected browser operations 134 for targeting a website under test, such that the browser operations 134 result in the browser events pertaining to the website performance, as depicted at step 320.

The logs 126 record the browser events for the performance agents 120 on the server 102, in which the operations 134 are provided by a single instantiation of the native operating system 112 providing the invoked operations, as disclosed at step 321. The single instantiation of the OS supporting multiple browsers 120-N conserves overhead that would otherwise be required to provide a dedicated OS for each browser instance. As indicated above, conventional browsers provide a single instantiation to support multiple windows, and multiple instances can interfere if concurrent execution results in redundant IO operations. Using the redirected browser operations in the collection segments 152, the logs 126 identifying a sequence of transactions 127, each of the transactions including at least one browser operation directed to a specific user oriented function of the website under test. Since conventional website metrics employ page loads as transaction milestones, the recorded transaction 127 is defined by a set of operations delimited by other than a fetch of a new web page, allowing capture of transactions that occur within a single page (via Ajax exchanges, for example, as is known in the art) and which would otherwise elude a performance indicator based on a page load, as depicted at step 322. The library 130 returns execution control to the performance agent 120 following the redirected operation 162 invocation and recordation of the browser event, such that execution returns to a point 168 at which an unredirected operation invocation would have resumed, allowing unhindered operation by the performance agent 120, and presenting a consistent, seamless user experience in the case of the interactive browser collection layer 150.

Those skilled in the art should readily appreciate that the programs and methods for multiple instance website test agents as defined herein are deliverable to a user processing and rendering device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for multiple instance website test agents has been particularly shown and described with references to embodiments thereof, it will be understood by those skilled in the art that various changes in form and details may be made therein without departing from the scope of the invention encompassed by the appended claims.

What is claimed is:

1. A computer-implemented method for gathering website performance data using a browser performance agent for performing website transactions comprising:
    loading a performance agent on a server computer, the performance agent for identifying and recording occurrences of browser events pertaining to website performance;
    redirecting, in the loaded performance agent, invocations of browser operations pertinent to website performance, the redirected invocations for recording the invoked browser operations;
    performing, via the performance agent, the redirected browser operations for targeting a website under test, the browser operations resulting in the browser events pertaining to website performance;
    recording the browser events pertaining to website performance on the server computer, the browser operations provided by a single instantiation of a native operating system providing the invoked browser operations; and
    returning execution control to the performance agent following the redirected operation invocation and recordation of the browser events, execution returning to a point at which an unredirected operation invocation would have resumed.

2. The method of claim 1 further comprising loading a plurality of performance agents, each performance agent independently invoking the browser operations as a separate user such that invoking one of the browser operations by one of the plurality of performance agents does not interfere with the others of the plurality of performance agents.

3. The method of claim 2 wherein the browser operations include defining user settings, further comprising redirecting those of the browser operations affecting the defined user settings for each performance agent independent of the user settings for the other performance agents.

4. The method of claim 3 wherein the browser operations are defined in a script file, the performance agent responsive to the script file for receiving the browser operations to invoke.

5. The method of claim 1 wherein loading further includes:
    identifying, in the performance agent, invocations to the browser operations, the browser operations being native services of the server computer, the native services provided by the native operating system such that each of the browser operations is part of the native services; and
identifying transfer points for deferring browser control to the browser operations in the native services.

6. The method of claim 5 wherein the native services are provided by a library of dynamic linked library (DLL) routines and the transfer points are entry points, each browser operation having an entry point, the native services being network services indicative of timing of network events, the network events for deriving performance data.

7. The method of claim 5 wherein redirecting further comprises:
copying, from the identified transfer point, instructions for invoking one of the browser operations in the native services;
inserting, at the identified transfer point, instructions to invoke a monitoring function in lieu of the instructions for invoking one of the browser operations in the native services; and
defining a monitoring sequence, the monitoring sequence including the copied instructions for invoking one of the browser operations in the native services and at least one call for recording a browser event.

8. The method of claim 7 further comprising defining a plurality of monitoring sequences in a collection layer, the collection layer for seamless interception of performance related browser operations, each of the monitoring sequences defined by a collection segment of code for encapsulating invocations of the browser operations resulting in browser events, the encapsulating for recording the timing of the invoked operations.

9. The method of claim 1 wherein loading the performance agent further comprises:
reading user specific settings for each performance agent instance of the plurality of performance agents;
launching the performance agent with a DLL specific to the performance agent such that other performance agents also have a specific, noninterfering, DLL; and
inserting a user agent string specific to the performance agent to present browser identity to the website under test.

10. The method of claim 9 wherein recording further comprises identifying a sequence of transactions, each of the transactions including at least one browser operation directed to a specific user oriented function of the website under test, the transaction defined by a set of operations delimited by other than a fetch of a new web page.

11. The method of claim 2 further comprising receiving a set of browser operations for which to perform redirection, each of the browser operations being in a library of network services.

12. The method of claim 11 wherein the network services are provided by an OS library shared by other processes.

13. The method of claim 2 wherein loading the performance agent further comprises downloading the performance agent onto a user operated machine with the redirected invocations of browser operations, the downloaded performance agent receiving interactive user commands for directing invocations of browser operations.

14. A server computer for gathering website performance data using multiple instances of browser performance agents for performing website transactions comprising:
a plurality of performance agents responsive to a loader for loading on the server computer, each performance agent for identifying and recording occurrences of browser events pertaining to website performance;
the loader for redirecting, in at least one of the loaded performance agents, invocations of browser operations pertinent to website performance, the redirected invocations for recording the invoked browser operations;
a collection layer for executing the redirected browser operations for targeting a website under test, the browser operations resulting in the browser events pertaining to the website performance;
a log repository for recording the browser events for at least one performance agent on the server computer, the browser operations provided by a single instantiation of a native operating system providing the invoked browser operations; and
a collection segment for returning, for each redirected invocation, execution control to the performance agent following the redirected operation invocation and recordation of the browser event, execution returning to a point at which an unredirected operation invocation would have resumed.

15. The server computer of claim 14 wherein the loader loads the plurality of performance agents, each performance agent independently invoking the browser operations as a separate user such that invoking one of the browser operations by one of the plurality of browser agents does not interfere with the others of the plurality of performance agents.

16. The server computer of claim 14 wherein the loader is further operable to:
identify, in the performance agent, invocations to the browser operations, the browser operations being native services of the server computer, the native services provided by the operating system such that each of the browser operations is part of the native services; and
identify transfer points for deferring browser control to the native services, the transfer points being entry points, the native services provided by a library of dynamic linked list (DLL) routines, the native services being network services indicative of timing of network events, the network events for deriving performance data.

17. The server computer of claim 14 wherein the loader is further operable to:
copy, from the identified transfer point, instructions for invoking one of the browser operations in the native services;
insert, at the identified transfer point, instructions to invoke a monitoring function in lieu of the instructions for invoking the operation in the native services; and
define a monitoring sequence, the monitoring sequence including the copied instructions for invoking one of the browser operations in the native services and at least one call for recording a browser event.

18. The server computer of claim 17 wherein the server computer is further operable to define a plurality of monitoring sequences in the collection layer, the collection layer for seamless interception of performance related browser calls, each of the monitoring sequences defined by a collection segment of code for encapsulating invocations of browser operations resulting in browser events, the encapsulating for recording the timing of the invoked browser operations.

19. The server computer of claim 16 wherein loading the performance agent further comprises:
reading user specific settings for each performance agent instance of the plurality of performance agents;
launching the performance agent with a DLL specific to the performance agent such that other performance agents also have a specific, noninterfering, DLL; and inserting a user agent string specific to the performance agent to present browser identity to the websites under test.

20. A computer program on a computer readable storage medium encoded as a set of processor based instructions that, upon execution by a processor, cause the computer to perform a method for gathering website performance data using a browser performance agent for performing website transactions comprising:

a processor responsive to the encoded set of instructions, the instructions for:

loading a performance agent on a server, the performance agent for identifying and recording occurrences of browser events pertaining to website performance;

redirecting, in the loaded performance agent, invocations of browser operations pertinent to the website performance, the redirected invocations for recording the invoked browser operations, redirecting further including:

copying, from an identified transfer point, instructions for invoking the browser operations;

inserting, at the identified transfer point, instructions to invoke a monitoring function in lieu of the instructions for invoking the browser operations; and defining a monitoring sequence, the monitoring sequence including the copied instructions and at least one call for recording a browser event;

performing, via the performance agent, the redirected browser operations for targeting a website under test, the browser operations resulting in the browser events pertaining to the website performance;

recording the browser events for at least one performance agent on the server computer, the browser operations provided by a single instantiation of a native operating system, the browser operations provided by a library of dynamic linked library (DLL) routines, each browser operation having an entry point and using native services, the native services including network services indicative of timing of network events, the network events for deriving performance data; and returning execution control to the performance agent following the redirected operation invocation and recordation of the browser event, execution returning to a point at which an unredirected operation invocation would have resumed.

\* \* \* \* \*